United States Patent [19]

Musil

[11] Patent Number: 5,170,924

[45] Date of Patent: Dec. 15, 1992

[54] FASTENING APPARATUS FOR SECURING BELT FASTENERS TO A CONVEYOR BELT

[75] Inventor: Edward C. Musil, Lyons, Ill.

[73] Assignee: Flexible Steel Lacing Company, Downers Grove, Ill.

[21] Appl. No.: 821,316

[22] Filed: Jan. 13, 1992

Related U.S. Application Data

[63] Continuation of Ser. No. 447,101, Dec. 6, 1989, abandoned.

[51] Int. Cl.$^5$ .................. F16G 3/16; B23P 11/00
[52] U.S. Cl. ..................... 227/111; 227/143; 227/153; 29/243.51
[58] Field of Search .............. 227/29, 30, 110, 111, 227/143, 152, 153; 29/243.51

[56] References Cited

U.S. PATENT DOCUMENTS

| | | | |
|---|---|---|---|
| 3,101,481 | 8/1963 | Neale . | |
| 3,142,842 | 8/1964 | Neale . | |
| 3,261,085 | 7/1966 | Hobson | 29/243.51 |
| 3,458,099 | 7/1969 | Schick | 227/111 |
| 4,050,138 | 9/1977 | Stolz | 29/243.51 |
| 4,144,628 | 3/1979 | Schick | 29/243.51 |
| 4,522,329 | 6/1985 | Stolz | 227/153 |
| 4,538,755 | 9/1985 | Schick | 227/152 |
| 4,789,092 | 12/1988 | Schick | 227/111 |

FOREIGN PATENT DOCUMENTS

| | | |
|---|---|---|
| 2582369 | 11/1986 | France . |
| 1325063 | 8/1973 | United Kingdom . |
| 1566409 | 4/1980 | United Kingdom . |
| 2202605 | 9/1988 | United Kingdom . |

Primary Examiner—Douglas D. Watts
Assistant Examiner—Rinaldi Rada
Attorney, Agent, or Firm—Fitch, Even, Tabin & Flannery

[57] ABSTRACT

A belt fastener apparatus and comb assembly is mounted and operable on a frame. The fastener apparatus is particularly applicable to wire loop-type fasteners and includes a locating pin to positively locate the punch and anvil arrangement to inhibit indexing the fastener apparatus prior to punch withdrawal from the comb bed and to provide independently operable punches which sequentially final-clinch a fastener and initially drive staples therethrough to reduce the work load on the fastener apparatus and operation.

18 Claims, 7 Drawing Sheets

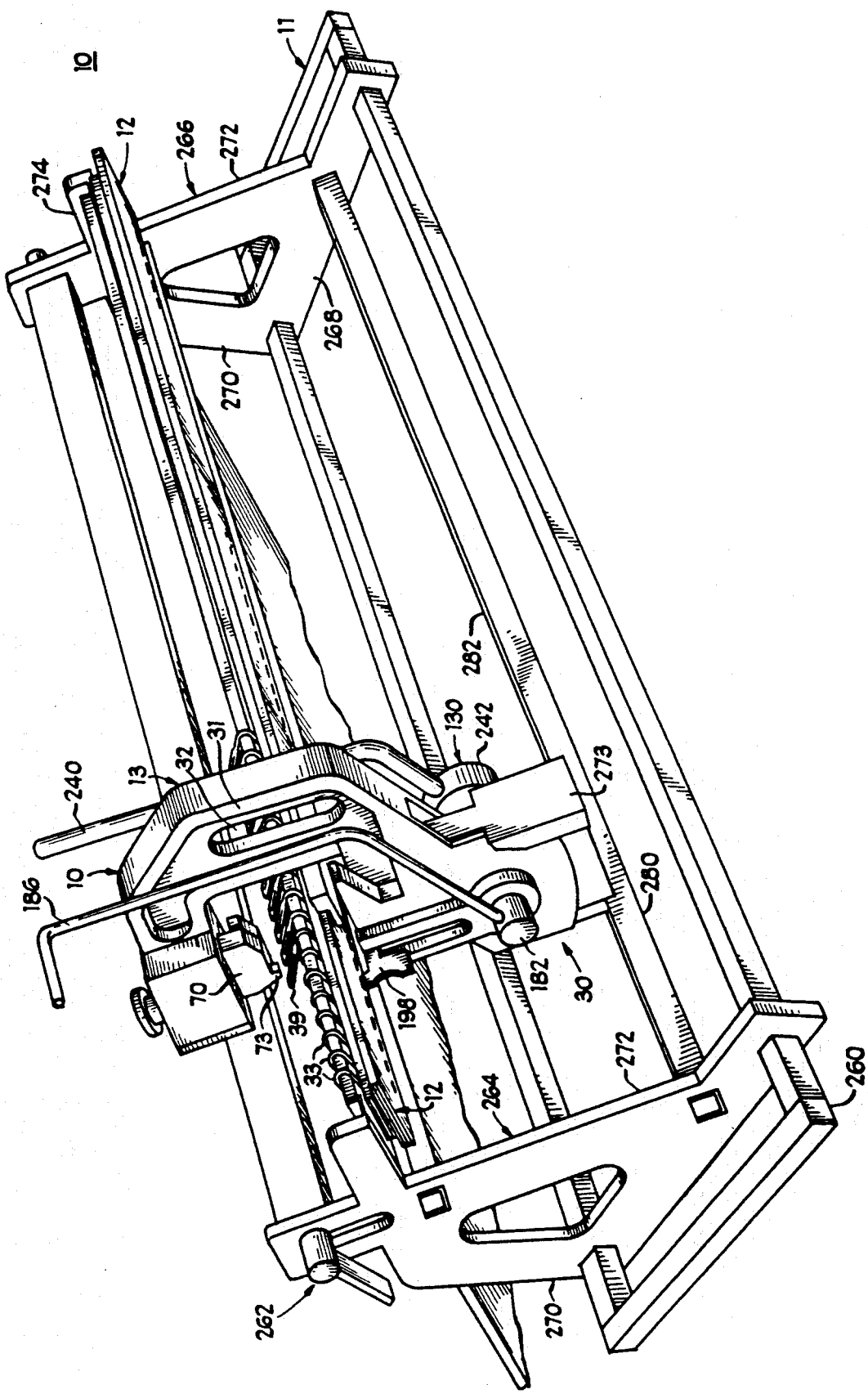

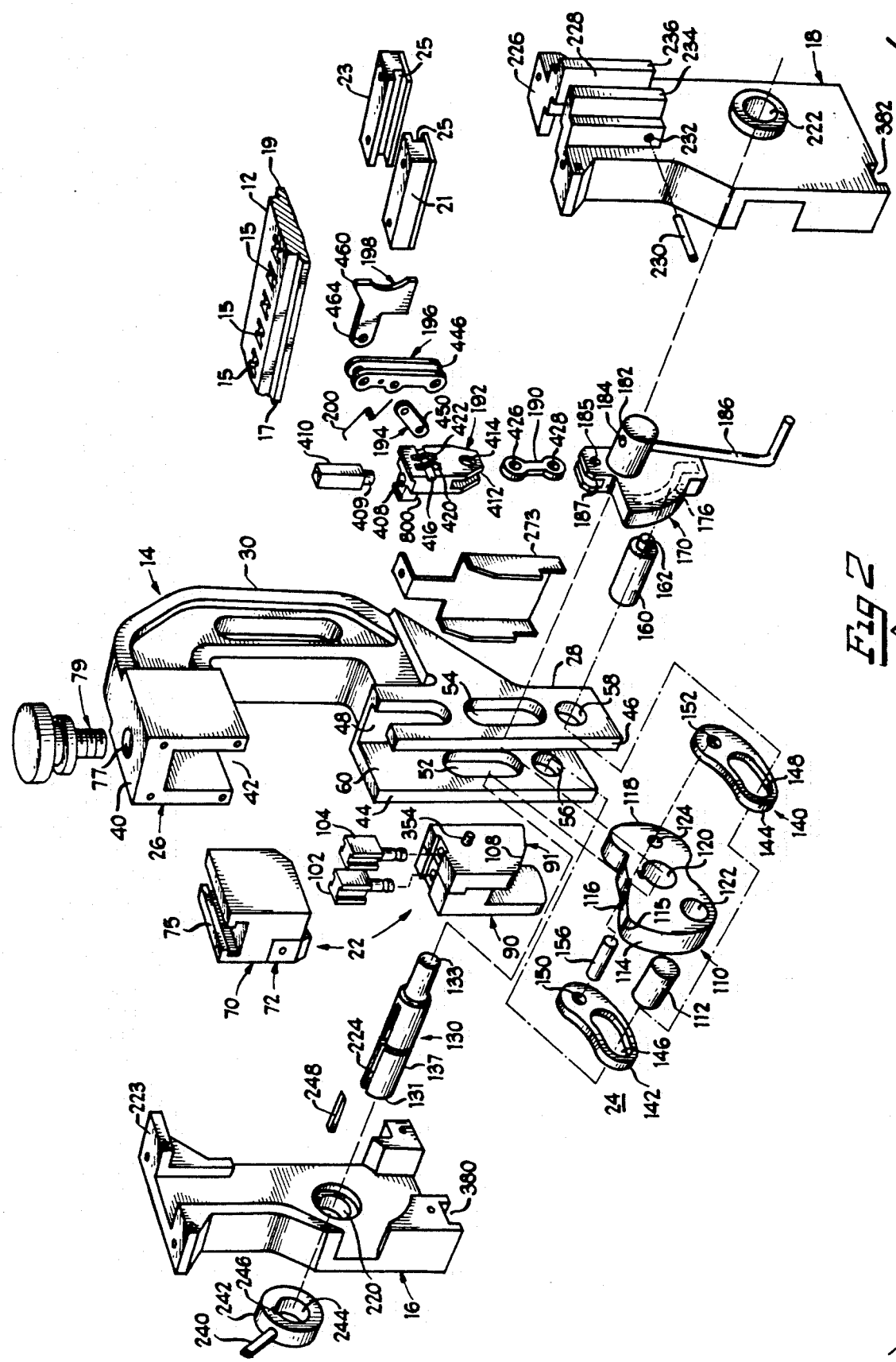

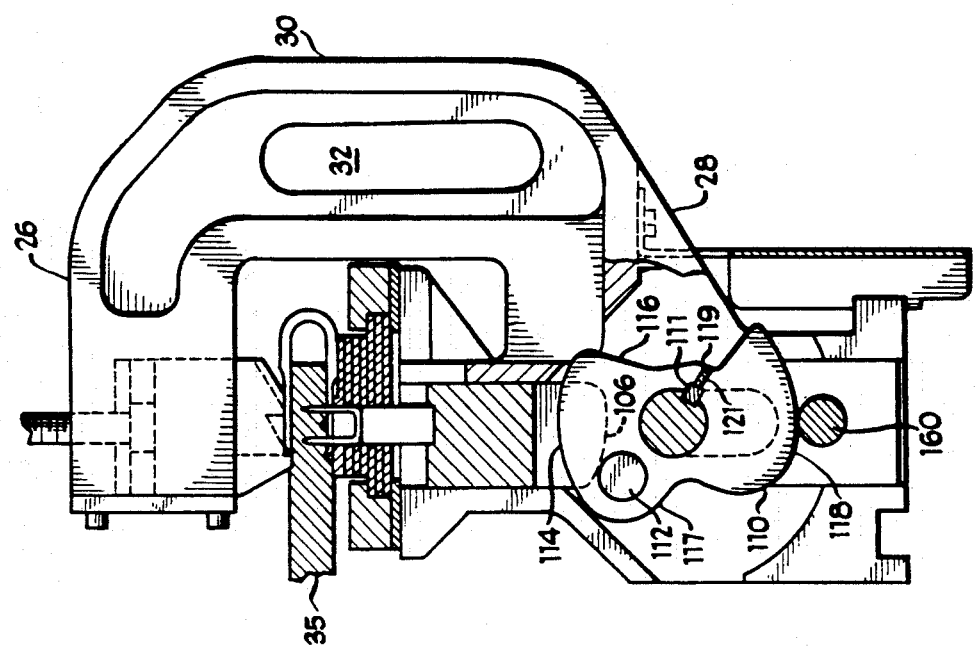
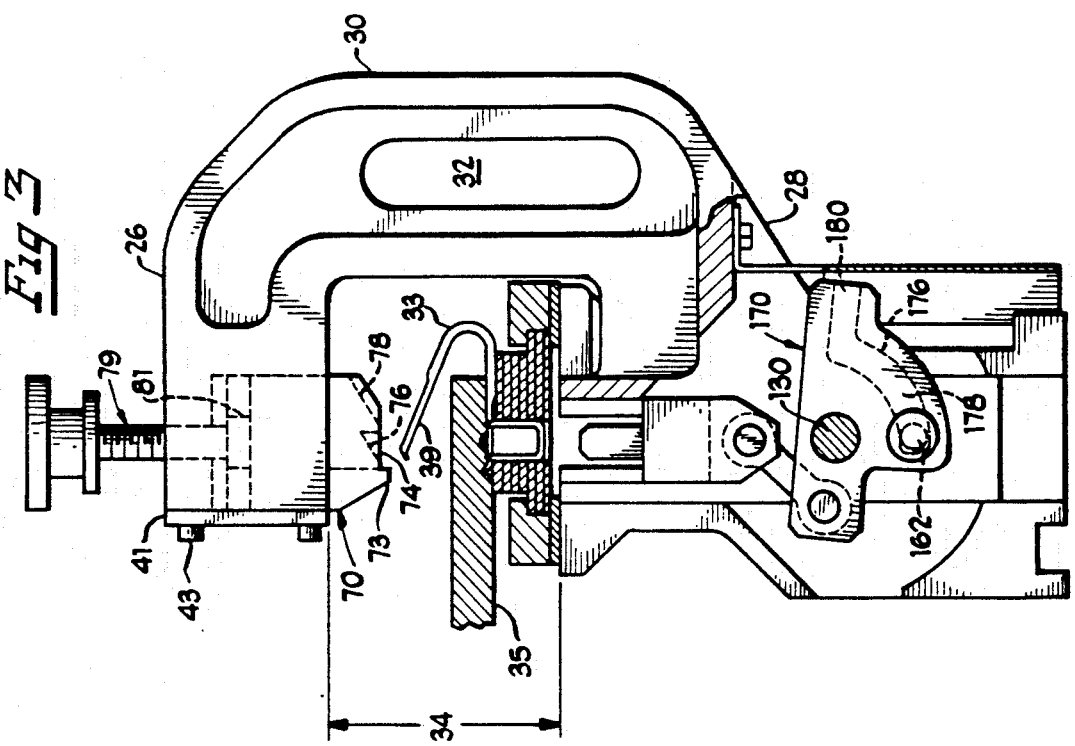

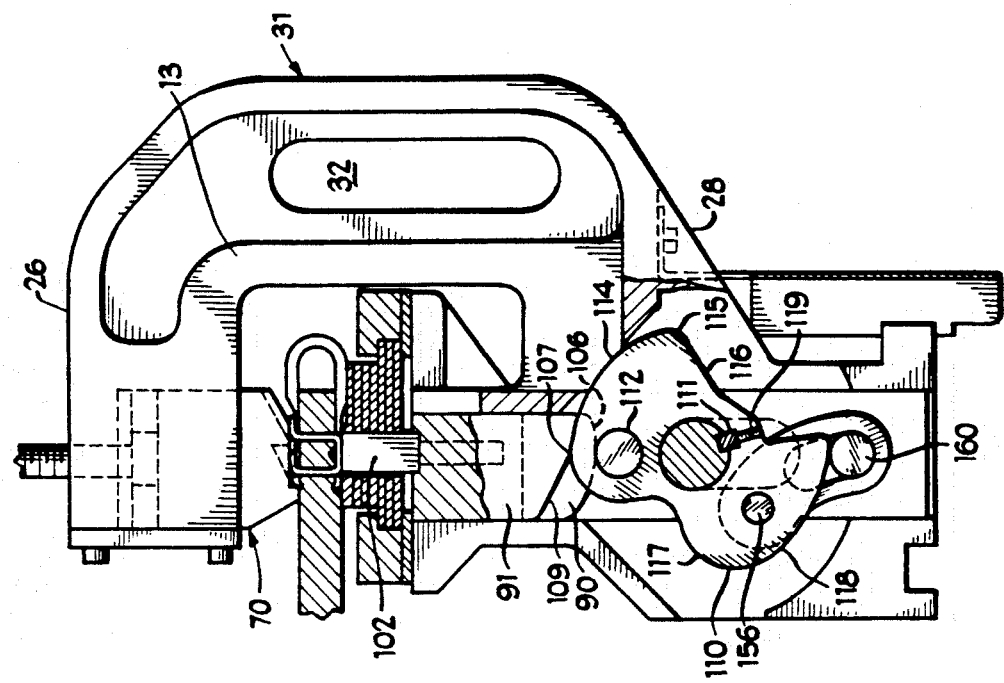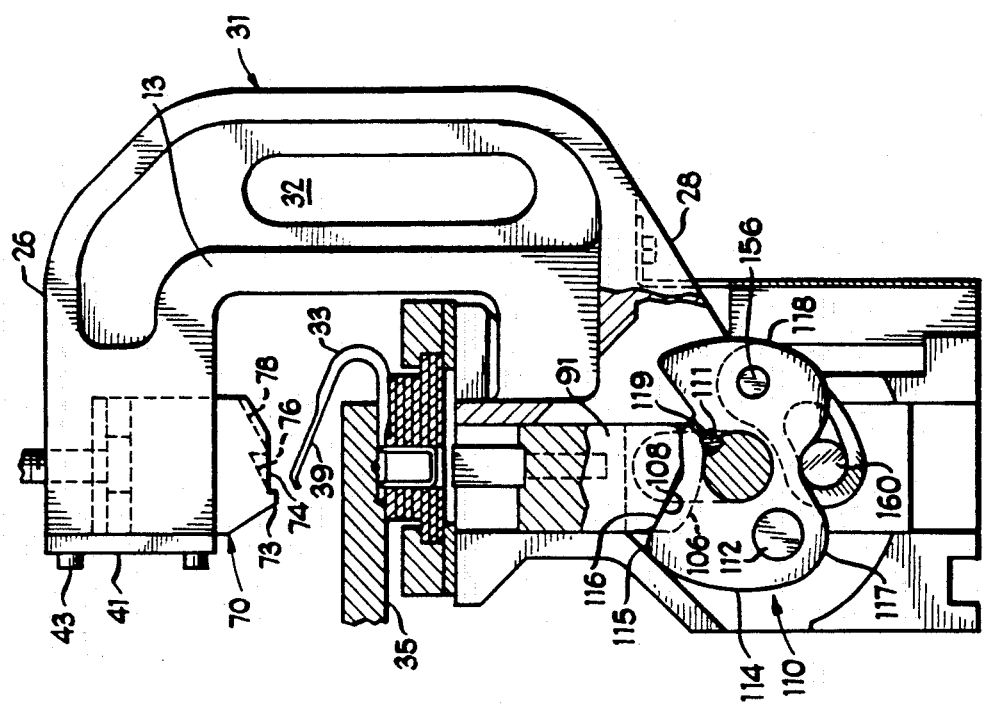

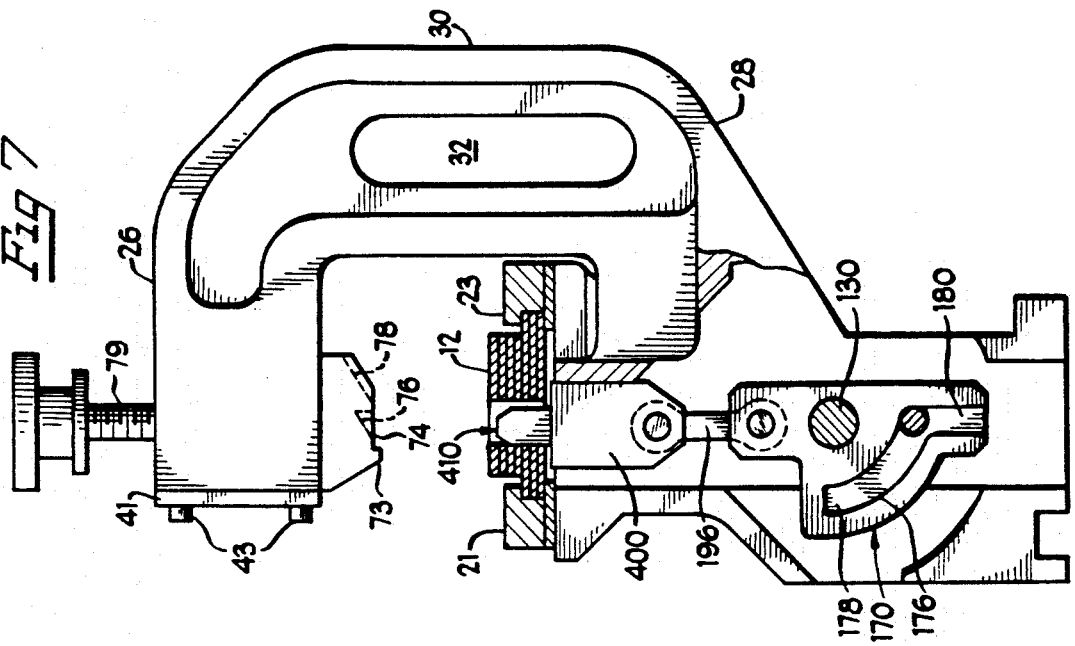
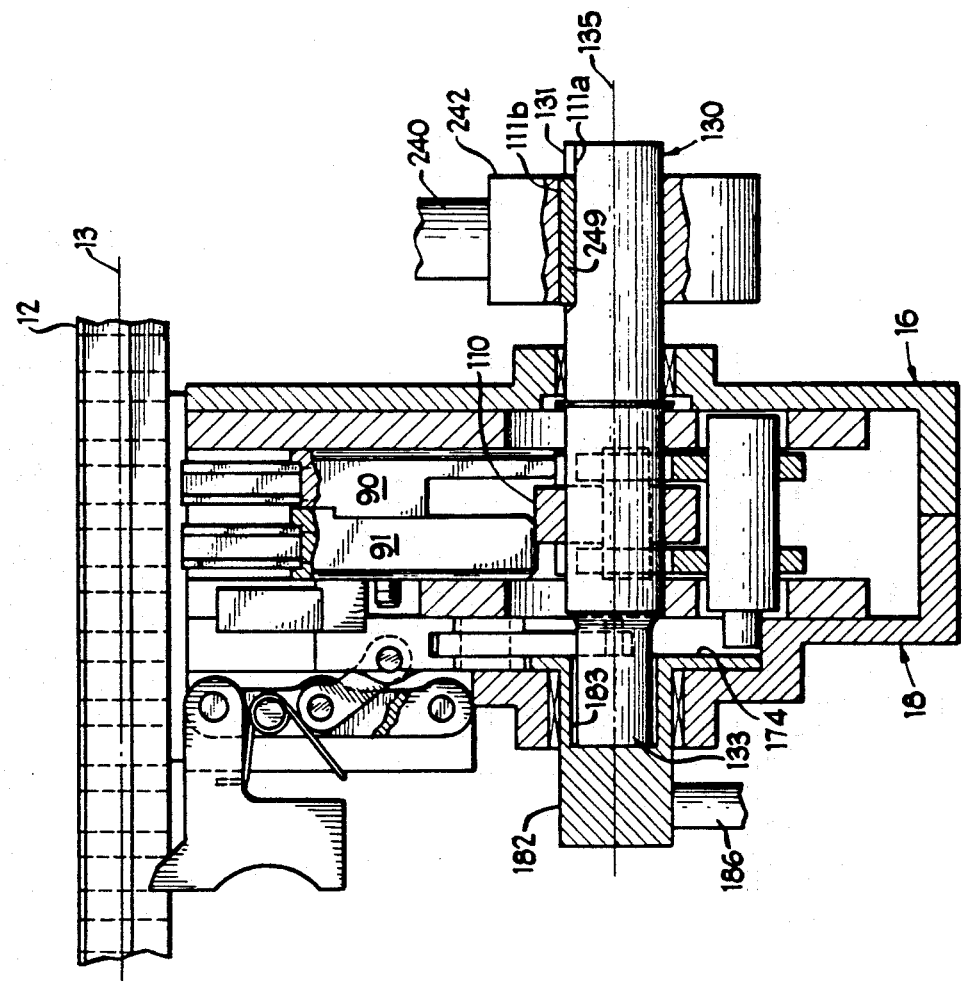

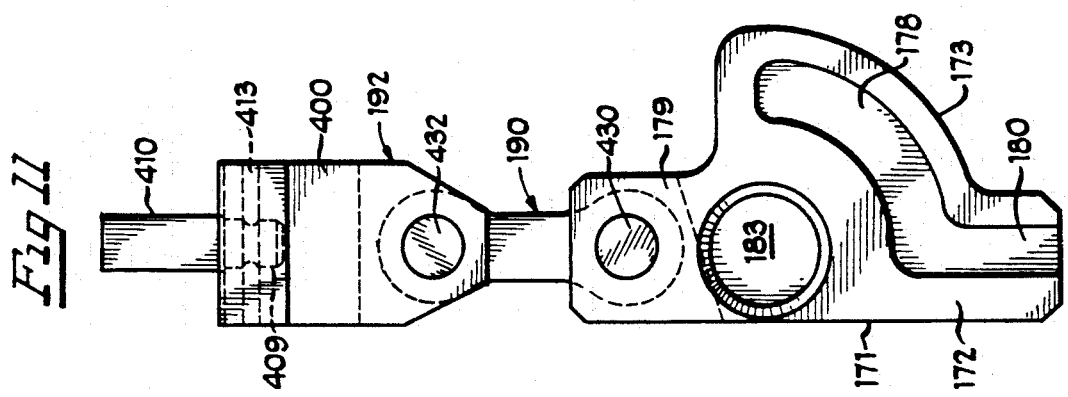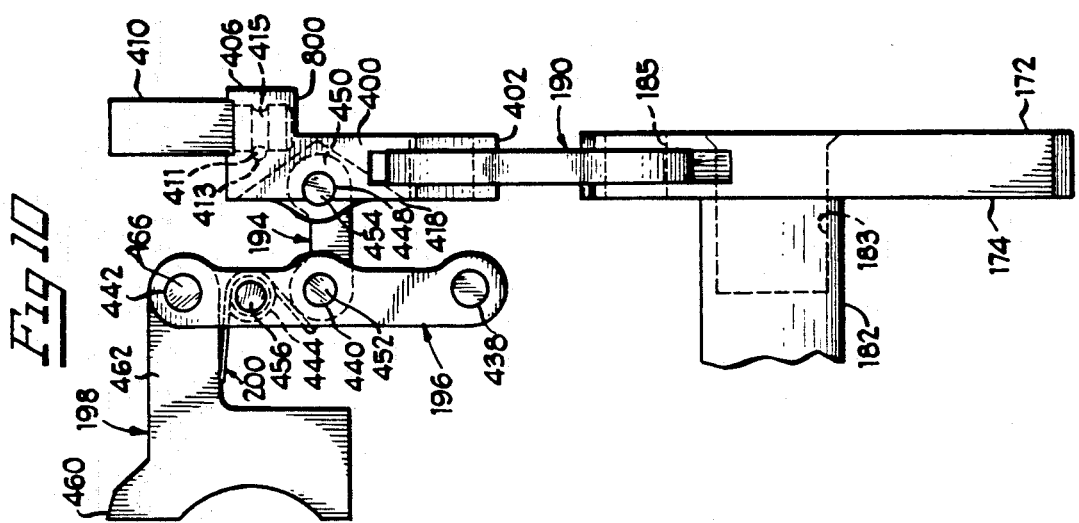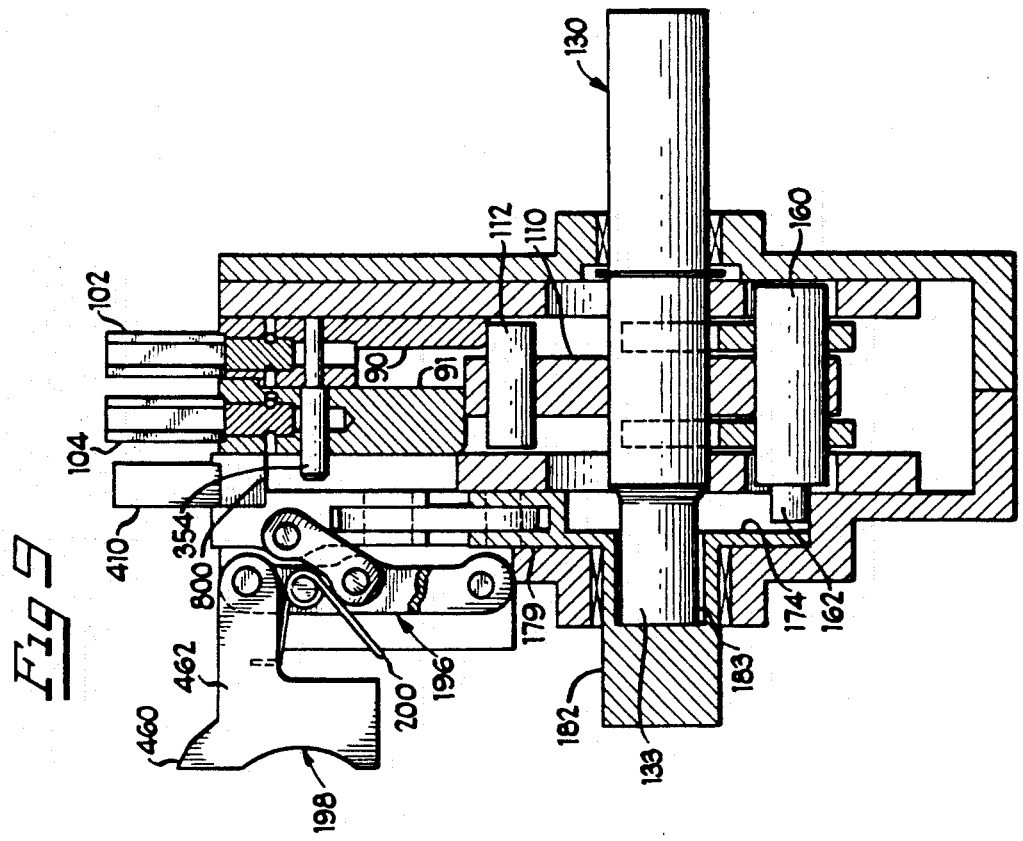

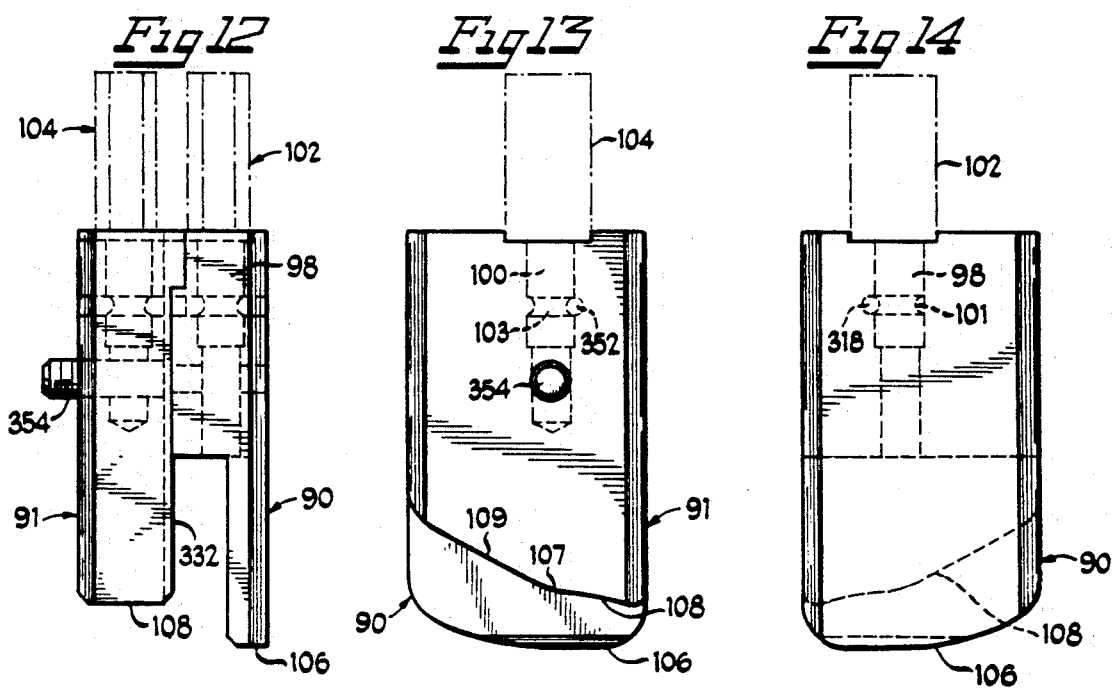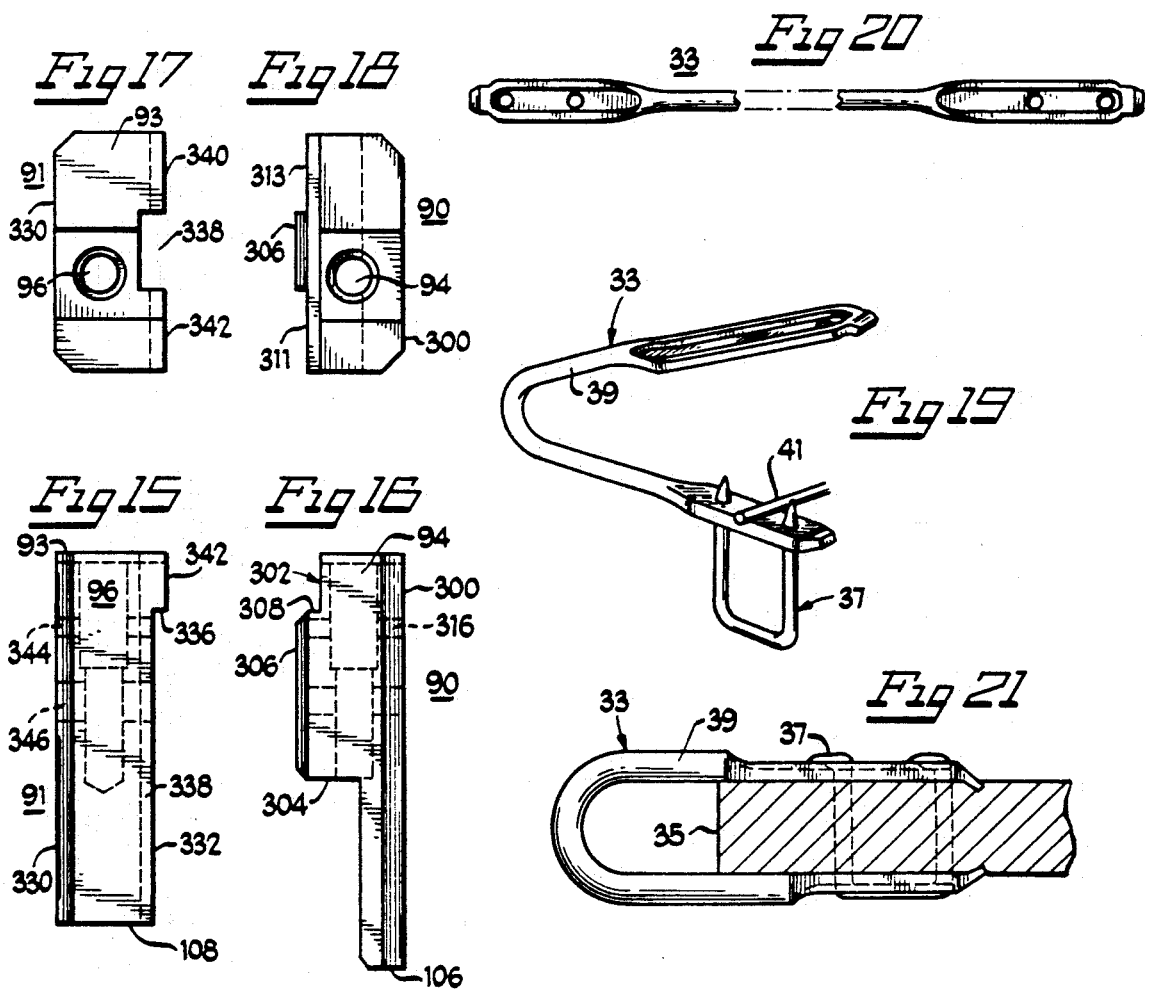

FASTENING APPARATUS FOR SECURING BELT FASTENERS TO A CONVEYOR BELT

This application is a continuation of application Ser. No. 447,101 filed Dec. 6, 1989, now abandoned.

BACKGROUND OF THE INVENTION

The present invention relates to apparatus for securing belt fasteners to a belt end. More particularly, the apparatus is a fastener for fastening stirrup-like or loop-type fasteners to a conveyor belt end. The secured fasteners have an extending loop and aperture for mating with an opposed belt-end arrangement of fasteners, which meshed fasteners cooperate and have a hinge loop for insertion of a rod for the coupling of the belt ends to provide a continuous belt.

The present invention is directed to an apparatus for driving staples through a belt to connect belt fasteners to a belt end. Tools to drive and clinch the staples to attach the belt fasteners to a belt end, often are operated in very difficult environments, such as in coal mines, where moisture and rock dust abound. In many mines, such as coal mines, pulverized limestone is used to coat the walls or ceilings to keep down the amount of coal dust in the air and thereby prevent explosions. Such pulverized rock material is everywhere and has a tendency to infiltrate operating parts of equipment and to act as a pumice to grind on rotating or mating sliding parts. Also, such rock dust and coal dust may accumulate inside of the staple applying tool and cause malfunctions particularly when the tool has several springs, levers and small operating parts.

In addition to operating in adverse conditions, it is preferred that the staple applying and clinching tool operate manually with an acceptable level of force. The particular location for attachment of belt fasteners to make a splice may be one where hydraulic or pneumatic drives for the tool are not available and the belt fasteners must be attached to the belt end by mechanical force applied by a person. Manifestly, the person providing the force for driving a plurality of staples for each belt fastener across a wide belt end prefers a tool that is less exhausting to work over a tool that requires greater force. The amount of force needed to bend and clinch the staples has increased with the switch from the more ductile steel staples to the less ductile stainless steel staples. The staple ends are bent over at 90° at their free ends; and such bending of stainless steel staple-free ends requires a considerable degree of force which, in the preferred embodiment, is generated by the operator using a mechanical machine. With more and heavier and diverse interior plies and cords in the belts, the job of driving the staple ends through the belt carcass has become increasingly difficult.

In addition to bending the staple-free ends over at 90° to clinch the belt fasteners to the belt end, the tool should force the belt fastener legs or plates on opposite sides of the belt tight against the upper and lower faces of the belt. That is, at the time of clinching the belt fastener, legs or plates should be pushed tightly against the belt so that they are not loose after the staples have been clinched.

Other considerations in a practical and commercially-acceptable tool for applying such forces and for operating in such adverse conditions, are to keep the tool cost competitive with other tools and to make it relatively maintenance-free and to have a relatively long life such that the tool does not wear out quickly. Also, the tool should be fairly simple to operate and should be relatively foolproof in its operation. Additionally, the belt fasteners must be spaced evenly to accept the hinge loop or knuckle from the belt fasteners on the other belt end for the splice. The tool operations for indexing and for registering the staple applying and bending mechanism at locations along the belt end should be mutually exclusive and noninterfering with the belt penetration and the staple-clinching actions.

Tools for applying and securing these various fasteners to belt ends include hand-driven punch and anvil apparatus; pneumatic and hydraulic tools; and, manually-operated fastening apparatus. The swinging of hammers or mauls to drive staples through belts and then to clinch may result in injury to the worker and is certainly fatiguing relative to the lever-operated devices now in use. An old hand-driven punch and anvil arrangement is disclosed and illustrated in Hobson U.S. Pat. No. 3,261,085, which has an upper plate with a comb to retain a plurality of staples to be driven into plate-like fasteners, and a chisel-like tool to drive a plurality, such as three, of staples with a single blow from a hammer. The driven staple ends extend through a belt and fastener to contact an arcuate anvil or lower surface to partially deform their end points. Thereafter, the fastening machine is indexed to position the formed staple ends above a flat surface for a second blow to final-clinch the staples and fastener to the belt end. An alternative apparatus also has an upper comb to retain a plurality of staples for insertion into U-shaped fasteners. The staples are manually driven through the fasteners and partially formed on a lower anvil surface. Subsequently, the upper comb is raised, a flat plate is overlaid the lower anvil surface, the belt end is repositioned over this flat, plate-like surface, for delivery of a second and final-clinching blow to the formed staples and fasteners on the belt end. A lever-operated guide comb and an anvil to flatten the staple points after their insertion into the fasteners is shown in French Patent No. 2,582,369.

Other fastener apparatus are provided which utilize a movable die arrangement on a bed assembly for sequential fastener forming, staple driving and final clinching of staples in stirrup-like fasteners. These fastening apparatus are frequently operable by handles coupled to tools through mechanical linkage, which drives a punch through a comb bed, thrusting a staple through a fastener end, and securing the staple by a final clinching action. The tool or die head is indexed to finally clinch and sequentially perform these functions on successive fasteners and staples. This operation is particularly illustrated in U.S. Pat. No. 4,789,092, which has a die operator movable by an indexing handle along a comb-bed assembly.

Belt-fastening staples may be inserted by a tool through fastener ends and may merely be deformed by pressing against a flat plate lower surface or an angled, anvil-type surface. A tool to perform this operation is provided in U.S. Pat. No. 3,458,099, where the staples are driven through the belt end and the staple ends are formed on a lower plate or anvil surface in opposed directions along the fastener end. Similarly, British Patent No. 1,566,409 illustrates a flat lower plate surface for forming the staple points after insertion in the belt and fastener end.

Other staple-securing apparatus are available which utilize a wiping action to form the staple ends after insertion for clinching the staples in fasteners for conveyor belts. The staples are driven through the fasteners and belt and, thereafter, by moving either the formed fastener and belt or the lower angled tool surface, the staple ends are bent to the form of the lower or upper surface of the fastened joint. The force required to wipe the staple ends, particularly when made of stainless steel, is quite large. The other difficulty with such wiping tools is how to force the belt fastener plates tightly against the belt while wiping across in a direction 90° to the direction of force application to push the belt fastener legs or plates into the belt faces. Representative of these wiping-action tools are Stolz U.S. Pat. No(s). 4,522,329 and 4,050,138; Neale U.S. Pat. No(s). 3,142,842 and 3,101,481; and British Patent 1,325,063—Hobson.

The above-noted assemblies do not provide a sequential drive apparatus for securing staples and fasteners along a belt end, which apparatus has a positive locating means, that insures proper tool alignment prior to tool insertion and retains the tool drive apparatus at its location until the tools are withdrawn to a reference position.

SUMMARY OF THE INVENTION

The present invention provides a fastening apparatus for securing and mounting belt end fasteners, especially wire loop fasteners, to a conveyor belt end. The fastening apparatus includes a stationary frame and a comb bed, which retains and positions the wire fasteners and staples. A movable head is indexical along the comb bed and includes a registering means for positively locating and aligning the fastening apparatus prior to tool actuation and engagement. The head carries a staple-insertion punch to drive the staple legs through the belt and for bending of the staple ends against an opposing anvil surface. A separate back-up punch and insertion punch are driven through and retractable from openings in the comb bed. The back-up punch extends through the bed assembly notches. An interlock between the indexing means and the operating means prevents punch movements until the registering pin has registered the movable head, thereby preventing damage to the punches, comb or operating mechanism. Anvil surfaces are located on a tool head opposite each of the punches, and are operable to close the open arm of the belt fastener and to squeeze the fastener to the belt end at the time of clinching. The dual punch arrangement is sequentially operable by the drive means, which has a cam-and-roller subassembly operable by a drive shaft. Operation of a manual index lever in a first direction indexes the head portion along the comb and registers the head portion relative to the comb. Operation of a manual-operating lever in a first direction turns cams which raise the back-up punch and lower the head position to clinch the bent staples and to press the belt fasteners tightly to the belt. Further operation in the same direction of the operating lever cams the staple insertion punch to push staple legs through the belt. Rotation of the manual lever in the opposite direction lifts the head and lowers the punches. A lifting of the manual index lever removes a registration pin to allow the movable head to be indexed when the index lever is next operated.

BRIEF DESCRIPTION OF THE DRAWINGS

FIG. 1 is a perspective view of a fastening apparatus and comb bed on a frame;

FIG. 2 is an exploded perspective view of the fastener assembly of FIG. 1;

FIG. 3 is a side elevational view of the fastener apparatus and advancing hub at the reference position;

FIG. 4 is a side elevational view of the fastener at initiation of the staple-driving operation;

FIG. 5 is a side elevational view of the fastening apparatus and driving-cam at the reference position;

FIG. 6 is a side elevational view of the driving cam and fastening apparatus at the clinching position;

FIG. 7 is a side elevational view of the fastener apparatus having the advancing hub with the locating pin in the comb bed;

FIG. 8 is a front elevational view in partial section of the fastening apparatus at the reference position;

FIG. 9 is a front elevational view in partial section of the fastening apparatus at the punch driver position;

FIG. 10 is a rear elevational view of the advancing assembly, advancing hub and locating pin;

FIG. 11 is a side elevational of the advancing hub and locating pin arrangement of FIG. 10;

FIG. 12 is a front elevational view of the final-clinching and staple-driving punch and piston arrangements;

FIG. 13 is an elevational view of the final-clinching punch and piston of FIG. 12;

FIG. 14 is an elevational view of the staple-driving punch and piston of FIG. 12;

FIG. 15 is a front elevational view of the final-clinching piston of FIG. 12;

FIG. 16 is a front elevational view of the staple-driving piston of FIG. 12;

FIG. 17 is a top plan view of the final-clinching piston of FIG. 12;

FIG. 18 is a top plan view of the staple-driving piston;

FIG. 19 illustrates a exemplary belt fastener and staple subassembly;

FIG. 20 is a top plan view of a belt fastener prior to preforming; and

FIG. 21 is a side elevational view of a fastener and staple secured to a belt end.

DETAILED DESCRIPTION OF PREFERRED EMBODIMENT

The present invention attaches belt fasteners (FIG. 19) to a belt end 35 by a staple punch 102 which drives legs of staples 37 through the fastener and belt end, and bends the staples over by first anvil surfaces 76 and 78 in a vertically movable head 30. A back-up punch 104 (FIG. 6) and an anvil surface 74 squeeze the previously bent over staple ends and the belt fastener arms tightly against opposite sides of the belt to tightly clinch the belt fasteners to the belt. The punches and anvil surfaces are carried on a head 30 which is indexed along a comb bed 12 by an indexing means and a registering means which includes a registering pin 410 (FIG. 7), which is inserted into an opening 15 in the comb to positively locate and lock the head against shifting when the insertion punch and back-up punch are driven through openings in the comb bed.

The head 30 and comb bed 12 are mounted and operable in a frame 11, as shown in FIG. 1, which components cooperate to provide the belt fastener assembly. The fastening apparatus 10 is illustrated in FIG. 2 in an exploded view and includes a partial sectional view of bed assembly 12, which is an elongate member mounted and secured in structural frame 11 with the head 30 slidably mounted thereon.

The head 30 (FIG. 2) has a plurality of components including: tool-bearing bracket 14, first body member 16 and second body member 18, advancing mechanism 20, tool members 22 and drive apparatus 24. Upper tool members 22, which comprise the anvil surfaces 74, 76 and 78, are mounted on bracket 14 and movable by drive apparatus 24 to flatten belt fasteners, such as fasteners 33 shown in FIGS. 19-21, and a lower tool member 22, in the form of the insertion punch 102, drives the staples 37 through belt end 35, as shown in FIG. 4 and to bend over the staple ends by the inclined anvil surfaces 76 and 78. After the head is indexed over one position, the staples 37 are final-formed and clinched in a subsequent operation (FIG. 6) to securely fasten the belt fasteners to the belt end. As shown in FIG. 6, belt fastener arms are tightly squeezed between anvil surface 74 of upper tool 22 and a back-up punch 104; and the belt is compressed and the staple ends are forced toward the staple head to retain the belt fastener arms tightly against the upper and lower surfaces of the belt. Advancing and indexing mechanism 20 indexes head 30 along comb bed assembly 12, and, also provides a locating or registering pin 410 to positively register the bracket and tool assembly relative to bed 12. Advancing mechanism 20 positively withdraws the punches from bed assembly 12 before the head 30 is allowed to index along bed assembly 12, which prevents damage and binding to tool members 22, as well as avoiding damage to bed assembly 12. The structure and operation of this assembly will be detailed below.

In FIGS. 3-7, the head 30 includes a C-shaped arm or vertically-movable head portion 13 which has an upper segment 26 and a lower segment 28 which are joined by an integral central segment or arm 31. The C-shaped head portion 13 has the upper and lower segments separated by an operating distance or gap 34 into which projects a belt end 35 and the comb bed. The head's connecting central portion 31, which joins upper and lower segments 26 and, 28, has a cutout 32 operable as a handle. Anvils surfaces 74, 76 and 78 are mounted in the upper segment 26 and the punches are located in the lower segment 28, and cooperate to form and secure fasteners 33 and staples 37 to the belt end 35. Upper segment 26 with upper wall 40 and cavity 42 is a tool holder for tool block 70 which has first and second acute angular surfaces 76 and 78. A lip 73 on the anvil extends vertically downward on tool block 70, which also has a lower anvil surface 74. Lip 73 contacts a fastener arm 39 to maintain the arm 39 and fastener 33 in position during flattening onto a belt end.

In FIG. 2, tool block 70 has a gib and slide 75 for a slide block 81 (FIG. 3), which is matable with adjusting means 79 extending through threaded bore 77 in upper wall 40 (cf. FIG. 3) for vertical adjustment and retention of tool block 70 in cavity 42. Alternative securing means may also be utilized to secure tool block 70 in cavity 42. The lower face of tool block 70 is a final clinching or anvil surface 74, and is approximately parallel to the belt surface and comb bed 12. To retain tool block 70 in cavity 42, a front plate 41 (FIGS. 3 and 4) is secured to upper segment 26 by bolts 43.

In FIGS. 12-18, there is illustrated the preferred back-up punch 104 and the insertion punch 102 which have a first piston 90 and a second piston 91, which in turn, have cam surfaces 106, 108, respectively. In FIGS. 16 and 18, first piston 90 has an outer face 300 and a slide bar 306 vertically extending along and outwardly projecting from inner face 302. A first guide way 311 and a second guide way 313 extend along face 302 on either side of projecting slide bar 306. Extending member 98 of first punch 102 has circumferential grooves 101 and is mounted in first piston passage 94 for retention by cross-pin 318 in aperture 316 nesting in groove 101. Similarly, extending member 100 of second piston punch 104 has circumferential grooves 103, and member 100 is insertable in second piston passage 96, and retained by second cross-pin 352 extending through second piston cross-pin aperture 344 to register with groove 103.

Second piston 91, outer face 330 and inner surface 332 upwardly extend from cam surface 108 to intersect with downwardly projecting and generally parallel surfaces 340 and 342 to intersect at a second shoulder 336. Longitudinal slot 338, which is between parallel guides 340 and 342, extends from upper punch surface 93 to cam surface 108 along inner face 332 for slidably nesting slide bar 306 and, guide ways 313 and 311 slidably engage guides 340 and 342 for reciprocal motion between first and second pistons 90, 91. Similarly, shoulders 308 and 336 of respective pistons 90, 91 are engagable for cooperative motion between the pistons. A return pin 354, such as a threaded rod, is positioned in return pin port 346 of second piston 91 for engagement by advancing mechanism 20 to positively return first and second pistons 90, 91 to the reference position.

Pistons 90 and 91 are mounted and operable in channel 60 of lower segment 28 of the head 14 between first side panel 44 and second side panel 46. Rear or bridging panel 48 forms a back surface to channel 60, which is substantially aligned with cavity 42 of upper segment 26. Pistons 90 and 91 are reciprocally operable in channel 60 by a driving arrangement to move the punches 102, 104 and anvil surfaces 74, 76 and 78, which cooperate to form and clinch belt fasteners to a belt end.

Cam operator 110 in FIG. 2 has a generally centrally located aperture 120, a roller pin passage 122, and linking pin passage 124, which passages are transverse to the elongate direction of the cam operator. Generally cylindrical main shaft 130 has a first end 131, a second end 133, a longitudinal axis 135 and a keyway 224 in its outer surface 137. Shaft 130 extends through first elongate slot 52 and second elongate slot 54 of lower bracket segment 28 with first and second ends 131, 133 protruding from first and second sidewalls 44, 46. Cam operator 110 is mounted on shaft 130 through central aperture 120 in channel 60. In this arrangement, upper surface 116 of cam operator 110 engages second piston cam 108 and is rotatable to move second punch 104 to engage a lower surface of a staple-and-fastener arrangement for final clinching of the upper ends of the staples against anvil surface 74. As noted in FIGS. 4 and 6, cam operator 110 is secured on main shaft 130 by a securing set screw 119 extending through a threaded bore 121 in cam 110 upper surface 116 to contact shaft 130 or key 248 in main shaft keyway 224.

First link 142 and second link 144 of return linkage 140 in FIG. 2 are positioned in channel 60 with cam operator 110 therebetween. Links 142 and 144 have arcuate passages 146, 148, and pin ports 150, 152, respectively. Linking pin 156 extending through cam port 124 and linking-pin ports 150 and 152 pivotably connects parallel links 142, 144 in channel 60. Cam roller 160 extends through-bores 56 and 58 of bracket lower segment 28 and passages 146, 148 of links 142, 144, respectively, with lower surface 117 of cam operator 110 resting on cam roller 160. Rotation of cam 110 will engage second piston cam surface 108, and links 142 and 144 will pivot on roller pin 160 as they track the rotation of cam 110 on shaft 130 to move cam roller pin 112 protruding from either side of cam 110 into engagement with piston 90 (cf. FIG. 9).

Advancing hub 170 of advancing mechanism 20 has elongate segment 171 with an inner face 172 and an outer face 174 in FIGS. 2, 10 and 11. An arcuate section 173 protrudes from one edge of elongate segment 171 with a slot 176 cut in inner face 172 having an arcuate portion 178 and a generally vertical slot section 180 intersecting and extending radially outwardly from arc portion 178 along elongate segment 171. A handle hub 182 extending from outer face 174 has a blindhole bore 183 open at inner face 172 to receive second end 133 of main shaft 130 which rotates freely in the bore 183. An operating handle 186 is insertable in handle hub crossport 184, as shown in FIGS. 2 and 8. Advancing hub 170 is mounted against second sidewall 46 of bracket lower segment 28 with protruding lug 162 of cam roller 160 extending into slot 176 for controlled movement therein. Rotation of handle 186 moves hub 170 and lug 162 from the terminus of arcuate slot portion 178 (cf. FIG. 3), into vertical slot section 180. Thus, bracket 14 can slide vertically downward in the figures and upper tool bracket segment 26 can move to a staple-driving and clinching position when handle 240 is rotated.

A fork 179 in hub elongate segment 171 is opposite radial slot 180, which fork has a connecting-link bore 185 and a cross-slot 187 to receive and drive the mechanical linkage for advancing mechanism 20. The mechanical linkage of advancing mechanism 20 has a cam link 190; an advancing piston 192; a short connecting link 194; a long connecting link 196; an advancing lever 198; and, a biasing spring 200. Advancing piston body 400 has a lower end 402 with open groove 412 and crossbore 414 transverse thereto. Pin 430 is inserted through bore 185 and one of first and second bores 426, 428, which are at opposed ends of cam link 190, to rotatably secure link 190 to hub 170. Connecting link 190 is similarly matable with groove 412 by second connecting pin 432, which rotatably couples advancing hub 170 and advancing piston 192.

Long advancing link 196 has a pair of juxtaposed similar plate links with a gap 446 (FIG. 2) therebetween, which links have an elongate shape, as noted in FIGS. 2 and 8–10. First, second and third pivot crossports 438, 440 and 442 are approximately equally spaced along link 196, and a bias means pin port 444 is provided between second and third cross-ports 440 and 442. Short advancing link 194 is rotatably coupled to link 196 by a connecting rod 452 extending through crossport 440, and second passage 450 (FIG. 2) of short link 196. Link 196 is rotatably coupled to advancing lever 198 by a coupling rod 466. Furrow 416 in face 418 of advancing piston 192 has first and second straps 420, 422 providing a hinge loop, and first passage 448 of short link 194 is rotatably coupled to body 400 by rod 454 extending through the loop and passage 448 (FIG. 10).

Pintle 460 of advancing lever 198 is pivotably connected to link 196 by pin or rod 466 extending through third port 442 and bore 464 of arm 462. Bias means 200 is secured to link 196 by coupling pin 456 in port 444 and contacts arm 462 to bias advancing lever 198 vertically upward as shown in the figures.

The precise registration of the head 30 relative to the comb and the belt fasteners on the comb is by means of insertion of the registering or locating pin 440 in an opening 15 in the comb. As will be explained, the downward rotation of the handle 186 inserts the locating pin 410 in an opening 15 in the comb bed 12 after each sequential step of advancement of the head 30 along the comb. Locating pin 410 is mounted on piston retainer 406 extending from body 400 and includes an orifice 408 for locating pin stub 409. A cross-pin 411 in aperture 413 mates with groove 415 on stub 409 to secure the locating pin 410 to retainer 406. As best seen in FIGS. 8 and 9, the locating pin 410 is too short to engage the lower ends of the staples and is offset from any of the anvil surfaces 74, 76 and 78. Hence, the sole function of the locating pin 410 is registering. The locating pin 410 does not act as punch or an anvil for the staples.

In addition to the movable head portion 13, the head 30 includes a first body casting 16 (FIG. 2) which is positioned adjacent first sidewall 44 of tool bracket 14, and generally encloses one side of lower segment 28. The head 30 includes a second body casting 18 is similarly positioned in proximity to second sidewall 46, with advancing mechanism 20 projecting into side slit 228 and secured by an anchor pin 230 extending through pin hole 232 of ribs 234 and 236 on either side of slit 228, which pin 230 extends through first port 438 of long advancing link 196 and provides an anchoring or fulcrum point for advancing mechanism 20. Handle hub 182 extends through bearing crossbore 222 of second body casting 18; and, first end 131 of main shaft 130 protrudes through first body casting bearing crossbore 220. Drive lever 240 has a mounting collar 242 with a passage 244 and keyway 246, which collar and lever are mounted on shaft 130 at first end 131 and are secured by key 248 positioned in keyways 246 and 224. Key 248 extends into keyway 111 of cam operator 110 to operatively secure cam operator 110 to shaft 130 and a set screw 119 holds the key 248 against sliding from the keyway 111. Another key 249 (FIG. 8) projects into keyways 111a and 111b on the collar 242 and shaft 130.

A plurality of staple-retaining notches or openings 15 of comb bed 12 are spaced along longitudinal axis 135, which notches 15 receive the bridging arm or closed end of staples 37, as shown in FIGS. 3-5. Projecting first slide bar 17 and second slide bar 19 of bed 12 are parallel to axis 13 on opposite sides of bed 12, and are seated in a channel 25 of first L-gib 21 or second L-gib 23, secured to first and second body casting surfaces 223, 226, respectively, to maintain bracket 14 aligned thereon.

In FIG. 1 base 260 of frame 11 is illustrated as a rectangular frame of tubing. A belt clamping assembly 262 extending essentially the length of base 260 is mounted on tubing base 260 at generally right-triangle shaped end panels 264, 266 with the triangle base 268 positioned on base 260 and the triangle height 270 vertically extending from a lengthwise edge of base 260. A mounting arm 274 extends approximately normal to the hypotenuse leg 272 and comb bed 12, which is illustrated as a laminate structure, is secured approximately perpendicular to and spatially displaced from leg 272 of end panels 264, 266. Mounting block 280 with longitudinal guide bar 282 extends between hypotenuse legs 272 of end panels 264 and 266, and slotted guides 380 and 382 of respective body castings 16 and 18 are positioned over the longitudinal-guide-bar 282 to stabilize the head 30 between comb 12 and guide bar 282. The head 30 is thus slidable along comb bed 12 between end panels 264, 266. A cover plate 273 is mounted on lower segment 28 to protect the mechanism from extraneous material.

The head 30 is mounted and operable along comb bed 12 on frame structure 11 to bend down the upper arm of the belt fasteners 33 flat against the belt end 35 and to drive staples 37 into and through belt fasteners 33 positioned on a belt end. Generally, a plurality of U-shaped belt end fasteners 33 (cf. FIGS. 19-21), which have an upper and lower arm joined by a bridging loop and having a dual-legged staple retained in one of the arm apertures, are positioned in comb bed 12 with the staples nested in notches 15 of bed 12. A plurality of fasteners 33 may be provided as an elongated subassembly or a collection of juxtaposed fasteners joined by a common bonding means, such as a wire or rod 41 in FIG. 19, the particular fastener arrangement being a design choice. Thereafter, belt 35 is positioned in the gap between the arms of the plurality of fasteners. The precise depth of the belt end insertion into the gap or belt penetration may be accommodated by belt stops or belt stop technique known in the art. Belt 35, which extends through clamp apparatus 262, is secured in position by apparatus 262.

At the belt-inserted position, the head 30 is in a reference position (cf. FIGS. 3, 5 and 8) and rotating advancing hub 170 about main shaft 130 positions the terminus of arcuate section 178 of slot 176 at lug 62 of cam roller 160. A plurality of parts alignments occur at the reference position where anvil 70 is at a maximum separation distance 34 from bed 12, as illustrated in FIG. 3, and cam surface 108 of second piston 91 is nested against upper surface 116 of cam 110; punches 102 and 104 are withdrawn from and are below comb bed 12 (cf. FIG. 8); main shaft 130 is in proximity to lower edges of slots 52, 54; return links 142, 144 are completely rotated to their rear-most travel; and pilot pin 410 is withdrawn from notches 15 of bed 12. In this alignment of elements, rotation of advancing handle 186 which is in a first direction downwardly herein rotates advancing hub 170 and moves advancing lever 198 through linking mechanism 20 to index fastener apparatus 10 an incremental distance, generally the distance between successive notches 15 in comb bed 12. Continuing rotation of handle 186 rotates advancing hub slot 176 to vertically align the elongate segment 180 with channel 60 and introduces lug 162 to radial slot segment 180. Rotational motion of handle 186 initiates movement of linkage system 20 to move advancing piston 192 and locating pin 410 to engage one of comb bed slots 15, which positively locates fastener apparatus 10. Thus staple-punches 102, 104 are aligned with openings 15 as well as acute angle surfaces 73 and tool holder clinching surface 74, respectively, in bracket 14. Rotation of advancing handle 186 moves the following: bracket 14 on bed 12 to an operating or staple-driving position; main shaft 130 is about at the vertical lower end of slots 52, 54; and, locating pin 410 is in register with a notch 15. The indexing handle 186 is left in this downward position during the staple bending and clinching operations which are done by operation of the operating lever 240.

The operating lever 240 is moved in a first direction, which is downwardly and accomplishes at least three separate and distinct operations, the first of which is to raise the back-up punch 104 to engage the lower end of the previously bent staple; the second of which is to pull the movable head portion 13 downwardly to cause its anvil surface 74 to squeeze the bent staple ends and the arms of the belt fasteners tight against the belt and to compress the belt and thereby complete the clinching of staples and also at this time locator 73 engages the upper fastener 33 and bends this upper fastener arm down flat on the upper surface of the belt 35; and the third of which is to drive the insertion punch 102 upwardly to engage the lower head of the staple and to drive the staple-pointed ends and legs up through the belt carcass to and against the inclined anvil surfaces 76 and 78 which deflect and bend the staple legs to positions flat against the upper arm of the belt fastener. These three operations are accomplished in about 120° of operating lever rotation and are accomplished sequentially so that the force needed to pull the operating lever down is not too great.

In the operating position, driving lever 240 is operable to rotate main shaft 130 and cam operator 110, and the progression of cam operator 110 through a cycle of staple-driving and final-clinching is illustrated in FIGS. 3. In this sequence of motions, cam operator 110 has cam surface 108 of second piston 91 nested on upper cam surface 116 at the reference position (cf. FIG. 5). Continuing rotation of shaft 130 by handle 240, in FIG. 6, moves cam operator 110 through the initial arc of its rotational cycle and has moved piston 91 and tool 104 to its maximum travel height by relative translational movement of cam surfaces 108 and 116 along each other to nodal surfaces 107, 115, respectively. Subsequent rotation of cam operator 110 moves curved surface 114 along sloped surface 109 of piston 91, resulting in a generally stable maintenance of the vertical position of As handle 240 continues to rotate, cam surface 117 moves cam roller 160, and thus the C-shaped head portion 30, vertically downward to provide shaft 130 at the uppermost portion of vertical slots 52 and 54. The final downward movement of the head 13 causes the anvil surface 74 to squeeze the bent-over staple ends and the belt fastener arms tightly to compress the belt therebetween and to force the fastener arms 39 tightly against the belt end. Outer surface 118 of cam operator 110 contacts cam roller 160 after second piston 91 has attained its greatest vertical travel in channel 60. The continued rotation of cam 110 rotates piston driver pin 112 into engagement with lower cam surface 106 of first piston 90 to vertically displace first piston 90 and first punch 102 to drive staples 37 through belt 35, the upper formed arm of fastener 33 and to bend the staple end points against the inclined anvil surfaces 76 and 78. At top dead center (FIG. 6) of cam operator 110, driver pin 112 has moved first piston 90 and punch 102 to their maximum vertical travel in channel 60 while maintaining second punch 104 and piston 91 at their earlier-attained maximum vertical location. Staples 37 formed by first piston 102 in belt 35 now maintain belt 35 and fastener arms 39 in generally parallel alignment and merely need final clinching, while the staples and fasteners finally clinched by second punch 104 and anvil surface 74 are secured to belt 35. Thus, four belt fasteners are operated upon each time the operating lever 240 is pulled down. The indexing operation moves the head 30 one step so that previously bent over staples may be clinched with the operation of operating lever 240.

As noted above, first and second pistons 90, 91 are slidable relative to each other in channel 60, which allows independent actuation of second piston 91 for completion of final clinching before any force is applied to move first piston 90 to drive staples 37 through belt 35. This reduces the work load on the operator at any point in the operating cycle to that load necessary for either single operation.

Completion of the operating cycle is provided by reversal of the above-noted shaft-rotating steps, that is return of driving lever 240 to its reference position, which rotates cam operator 110 to the reference position on shaft 130. However, punches 102, 104 and thus pistons 90, 91 may require mechanical force to remove them from notches 15 in bed 12. Rotation of cam operator 110 to the reference position permits movement of cam lug 162 in slot 176 of advance hub 170 and, movement of cam roller 160 and bracket 14 to the reference position. That is, rotation of the advance operating lever 186 in the upward direction lowers shoulder 800 (FIGS. 9 and 10) on the locating pin 410 to abut the pin 354 on the piston 91 and thereby mechanically withdraws second piston 91 and second punch 104 from the bed. The interlocking shoulders 336 and 308 of second piston 91 and first piston 90 simultaneously cause a withdrawal of the first punch 102 from bed 12 as the locating pin is withdrawn. Therefore, this action has positively removed the first and second punches 102, 104 from comb bed 12 before the head 30 can be indexed along comb bed 12, thereby removing them from potential damage by an inadvertent translation of head 30 along bed 12. After the operating lever 240 is rotated into the upper position, the operator will then grasp the index lever 186 and pivot it up; and this upward movement lowers the locating pin 410, and the head 30 is thus ready to be indexed along the comb with the next downward pull of the indexing lever 186.

It can be seen that this arrangement positively locates the movable head 30 without any manual positioning by the operator; prevents tool damage from inadvertent movement of the fastening apparatus; requires the operator to only perform one operation at a time, that is final clinching or staple driving, thus maintaining his workload to a single function; and, provides a positive means integral with the tool assembly for affirmative punch removal from comb bed 12.

The preferred embodiment of the invention illustrated and described herein, uses the manual levers 186 and 240 to provide the power to index the movable head 30 and to drive and to clinch the staples. Rather than using manual force, the shaft 130 may be power-driven through the rotational movements herein described.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. An applicator apparatus for securing belt fasteners to a belt with staples having a base and legs, said apparatus comprising:

a stationary frame for holding the belt,
   a comb on said frame for holding a row of belt fasteners,
   a movable had mounted on the frame for indexing movement for driving staples and clinching staples, a vertically-movable portion on the head having a first anvil surface on the head for bending over legs on the staples and having a second anvil surface on the head for clinching the bent staples and belt fasteners tightly against the belt,
   a back-up punch on the head for pushing on the bent staple during the clinching operation with the second anvil surface,
   a penetrating punch on the head for pushing staples through the belt and against the first anvil surface to bend over ends of the staples,
   an indexing means for indexing the head stepwise along the belt and a row of belt fasteners in the comb and including a registering pin insertable into the comb at a location spaced from the back-up punch and the penetrating punch and driven into the comb to register the head at a position in which the back-up punch and the penetrating punch are aligned with staples,
   a first operating means having a first operator moving the back-up punch during one portion of the movement of the operating means for moving the back-up punch against the base of the staple, a second operator for pulling the vertically-movable portion of the head against the legs of the staple to squeeze the bent staple to clinch the bent staple, a third operator movable by the operating means during another portion of the movement of the operating means to drive the penetrating punch to force the staple legs through the belt and to bend them against the first anvil surface, and
   a second operating means including a manually operating lever operable independently and prior to the operation of the first operation of means independent of the first operating means and having a s its sole function the operating of the indexing means to index the head and to insert the registering pin into the comb.

2. An applicator apparatus for securing belt fasteners to a belt with staples having a base and legs, said apparatus comprising:

a stationary frame for holding the belt,
   a comb on said frame for holding a row of belt fasteners,
   a movable head mounted on the frame for indexing movement for driving staples and clinching staples, a vertically-movable portion on the head having a first anvil surface on the head for bending over legs on the staples and having a second anvil surface on the head for clinching the bent staples and belt fasteners tightly against the belt,
   a back-up punch on the head for pushing on the bent staple during the clinching operation with the second anvil surface,
   a penetrating punch on the head for pushing staples through the belt and against the first anvil surface to bend over ends of the staples,
   an indexing means for indexing the head stepwise along the belt and a row of belt fasteners in the comb and including means to register the head at a position in which the back-up punch and the penetrating punch are aligned with staples, and
   an operating means having a first operator moving the back-up punch during one portion of the movement of the operating means for moving the back-up punch against the base of the staple, a second operator for pulling the vertically-movable portion of the head against the legs of the staple to squeeze the bent staple to clinch the bent staple, a third operator movable by the operating means during another portion of the movement of the operating means to drive the penetrating punch to force the staple legs through the belt and to bend them against the first anvil surface, the indexing means including a first manually-operated lever for indexing the head and the operating means including a second, the head portion and the penetration punch.

3. An applicator apparatus in accordance with claim 2 in which the first operator includes a first cam means to drive the back-up punch against the bent staple, the second operator includes a second cam means to drive the head portion against the other side of the staple to clinch the bent staple to the belt, the third operator includes a third cam means to drive the penetration punch to force staples to penetrate the belt and to bend ends of staple legs.

4. An applicator apparatus in accordance with claim 3 in which said means to register the head includes an index pin for insertion into an opening in the comb, movement of the index lever in one direction indexing the movable head and registering the head by insertion of the pin into the comb, and movement of the index lever in an opposite direction removing the index pin from the comb.

5. An applicator apparatus in accordance with claim 4 in which the first manually-operated lever is pulled down to index the head and to register the head, the second manually-operated lever is pulled down to raise the back-up punch and then to lower the head portion and then to raise the penetration punch, the second manual lever is then pulled up to raise the head, and then the first manually-operated lever is raised to lower the index and to lower the back-up penetration punches, thereby allowing the head to index to the next position.

6. An applicator apparatus for securing belt fasteners to a belt with staples, said apparatus comprising:
a stationary frame for holding the belt,
a comb on said frame for holding a row of belt fasteners,
a movable head mounted on the frame for indexing movement and for driving staples and clinching staples, a vertically-movable portion on the head having a first anvil surface on the head for bending the staples and a second anvil surface on the head for clinching the bent staples and belt fasteners tightly against the belt,
a back-up punch on the head for pushing on the bent staple during the clinching operation with the second anvil surface,
a penetration punch on the head for pushing staples through the belt and against the first anvil surface,
an indexing means for indexing the head stepwise along the belt and a row of belt fasteners in the comb and including means to register the head at a position in which the back-up punch and the penetrating punch are aligned with staples, and
a manually-operated, indexing lever for said indexing means for movement in a first direction to index the movable head and to register the head with comb,
an operating means including a manually-operating lever movable in a first direction for shifting the back-up punch and vertically-movable head portion to clinch the bent staple and to shift the penetrating punch to insert a staple through the belt and to bend the staple,
said manually-operating lever being movable in a direction opposite to the first direction to return the punches and the head portion from engagement with the staples,
said manually-operated index lever being movable in a direction opposite to the first direction to disable said registering means to allow the head to shift along the comb.

7. An applicator apparatus in accordance with claim 6 in which said operating means comprises rotating cam surfaces all driven by said operating lever to cam the back-up punch and the head portion to clinch the bent staple and to cam the penetrating punch to push the staple through the belt.

8. An applicator apparatus in accordance with claim 7 including an interlock between the indexing means and the operating means so that the latter is disabled until the indexing and registering of the head has been completed.

9. An applicator apparatus in accordance with claim 6 in which the back-up punch and the penetration punch include slidable, dual pistons disposed side-by-side for separate sequentially operation by the manually-operating lever.

10. A fastening apparatus for securing belt fasteners to a belt with staples having staple ends, which belt has a belt end and a belt surface, said fasteners having a first arm, a second arm and loop means for joining said arms, said fastening apparatus comprising:
a comb bed having a plurality of notches for receiving staples for insertion into said belt;
a frame, said comb bed mounted and secured to said frame;
a bracket mounted and operable on said frame and comb bed;
a first anvil surface, which first surface has at least one inclined face to contact and form said staples at an acute angle to said belt surface, and
a second anvil surface with a face approximately parallel to said belt surface;
a first tool piston and a second tool piston;
a first punch and a second punch, said first punch mounted and operable on said first piston,
said second punch mounted and operable on said second piston;
means for driving said first and second tool pistons;
said first punch and tool piston and second punch and tool piston mounted and operable by said driving means in said bracket and facing said first and second anvil surfaces, respectively;
means for incrementally indexing said bracket along said bed and frame, said indexing means being independent of the driving means and operable to move said bracket and first and second anvil surfaces to an operating position to form said fastener arms to said belt surface;
a locating pin mounted on and operable with said indexing means, said locating pin matable with said bed notches to positively align said bracket for engagement of said first and second punches in said comb bed notches;
one of said first and second punch and anvil surfaces cooperatively operable to close said fastener arms on said belt end, to drive said staples through said belt end and to form said staple ends at an acute angel to said belt surface;
the other of said first and second punch and anvil surfaces cooperatively operable to clinch said staples formed at an acute angle to secure said fasteners to said belt end; and,
said driving means operable to move said other punch to clinch said acute-angle formed staple ends against said fastener and, to move said one punch to drive said staples through said belt end and fastener arms, and to form said staple ends against said first anvil at an acute angle to said belt surface.

11. A fastening apparatus as claimed in claim 10, wherein said comb bed has a generally rectangular cross-section, a longitudinal axis, a first slide bar and a second slide bar extending from said comb bed and parallel to said longitudinal axis;
 a first side body and a second side body, which first and second side bodies are mountable to enclose said bracket;
 a first gib plate and a second gib plate mountable on aid side bodies and operable to contact said first and second slide bars, respectively, to maintain said bracket with said first anvil surface and punch and said second anvil surface and punch in facing alignment on said bed assembly;
 said first tool piston having a first cam surface and second tool piston having a second cam surface;
 said driving means to sequentially and independently drive said first and second tool pistons and punches and to cooperate with said first and second anvil surfaces, respectively, to sequentially clinch a partially-formed staples in said belt to said belt and fastener, and to thereafter drive the staple ends through the belt and to bend the staple ends at an angle acute to the belt.

12. A fastener apparatus for securing belt fasteners to a belt with staples having stable ends, which belt has a belt end and a belt surface, said fasteners having a first arm, a second arm and loop means for joining said arms, said fastening apparatus comprising:
 a comb bed having a plurality of notches for receiving staples for insertion into said belt;
 a frame, said comb bed mounted and secured to said frame;
 a bracket mounted and operable on said frame and comb bed;
 a first anvil surface, which first surface has at least one inclined fact to contact and form said stapling means at an acute angle to said belt surface, and
 a second anvil surface with a face approximately parallel to said belt surface;
 a first tool piston and a second tool piston;
 a first punch and a second punch, said first punch mounted and operable on said first piston,
 said second punch mounted and operable on said second piston;
 means for driving said first and second tool pistons;
 said first punch and tool piston and second punch and tool piston mounted and operable by said driving means in said bracket and facing said first and second anvil surfaces, respectively;
 means for incrementally indexing said bracket along said bed and frame, said indexing means operable to move said bracket and first and second anvil surfaces to an operating position to form said fastener arms to said belt surface;
 a locating pin mounted on and operable with said indexing means, said locating pin matable with said bed notches to positively align said bracket for engagement of said first and second punches in said comb bed notches;
 one of said first and second punch and anvil surfaces cooperatively operable to close said fastener arms on said belt end, to drive said staples through said belt end and to form said staple ends at an acute angle to said belt surface;
 the other of said first and second punch and anvil surfaces cooperatively operable to clinch said staples formed at an acute angle to secure said fasteners to said belt end;
 said driving means operable to move said other punch to clinch said acute-angle formed staples against said fastener and, to move said one punch to drive said staples through said belt end and fastener arms, and to form said staple ends against said first anvil at an acute angle to said belt surface,
 said comb bed having a generally rectangular cross-section, a longitudinal axis, a first slide bar and a second slide bar extending from said comb bed and parallel to said longitudinal axis;
 a first side body and a second side body, which first and second side bodies are mountable to enclose said bracket;
 a first gib plate and a second gib plate mountable on said side bodies and operable to contact said first and second slide bars, respectively, to maintain said bracket with said first anvil surface and punch and said second anvil surface and punch in facing alignment on said bed assembly;
 said first tool piston having a first cam surface and said second tool piston having a second cam surface;
 said driving means to sequentially drive said first and second tool piston and punch and to cooperate with said first and second anvil surfaces, respectively, to sequentially clinch a partially-formed staple means in said belt to said belt and fastener, and to thereafter drive the staple ends through the belt and to bend the staple ends at an angle acute to the belt;
 said driving means having a drive shaft and cam operator mounted on said drive shaft;
 each of said staples having at least one staple leg with a staple end;
 said first piston having a first cam surface 105 and said second piston 91 having a second cam surface;
 said cam operator having a piston contacting cam surface 116, to engage said second cam surface;
 a piston driver pin 112 mounted on and extending from said cam operator generally parallel to said piston contacting cam surface, which piston driver pin is operable to engage said first cam surface 106;
 said drive shaft operable to rotate said cam operator to slidably move said first piston and first punch to clinch a formed staple and fastener, and to engage said second piston cam surface with said piston driver pin to move said second punch and to drive said staple through said belt end to contact said other anvil face and partially form said staple leg at an acute angle.

13. A fastening apparatus as claimed in claim 12 wherein said indexing assembly has an indexing lever, an advancing hub and an advancing piston, which
 said locating pin mounted on said advancing piston, which locating pin is withdrawn from said comb bed notches at a fastening apparatus reference position;
 an advancing lever;
 means for coupling said advancing lever to said advancing piston;
 said indexing lever rotatably to move said advancing piston and to step said advancing lever to engage one of said plurality of comb bed notches to advance said bracket on said bed and frame an incremental distance, and to position said locating pin in another of said notches to accurately locate and position said bracket with said first and second punches and anvils along said comb bed; and, means for linking said advancing hub, index lever and said cam operator, which linking means maintains said cam operator in said reference position prior to securing said locating pin in one of said comb bed notches.

14. A fastening apparatus as claimed in claim 13 wherein said bracket has an upper segment, a lower segment and a coupling arm connecting said upper and lower segments;

said first and second anvils are mounted in said upper segment;

said lower segment having a first wall, a second wall and a channel between said first and second walls;

said first wall and second wall, respectively, defining a first slot and a second slot, which first and second slots are approximately parallel and aligned;

said first wall and second wall defining a first bore and a second bore, respectively, which bores are approximately parallel and aligned;

said advancing hub having an arcuate slot with a radial extension;

a cam roller with a first end and a second end extends through said first and second bores and said linking means, said cam roller having a projecting lug at one of said ends, which lug is positioned in said advancing hub arcuate slot;

said cam operator having a generally centered aperture, which cam operator and linking means are positioned in said channel;

said drive shaft extending through said sidewall first and second slots and cam aperture and rotatably positioned in said advancing hub;

said advancing hub operable to move said advancing lever and locating pin to provide each of said first and second anvils and punches in aligned position with a comb bed notch at a reference position and to move said bracket to an operating position to engage and form said fasteners to said belt end.

15. A fastening apparatus as claimed in claim 14 further comprising a linking pin, said linking pin extending through said cam operator and coupled to said linking means:

said linking means rotatable with said cam operator and operable to maintain said cam operator in contact with said cam roller.

16. A fastening apparatus as claimed in claim 15 wherein said cam operator has a lower curved surface, said curved surface operable to contact said cam roller to move said bracket to a final operating position to finally form said fastener and to fully extend said first and second punches through said comb bed to drive and clinch said staples.

17. A fastening apparatus as claimed in claim 16 wherein said locating pin and said coupling means cooperate to allow said bracket to incrementally index along said comb bed only with said first and second punches and anvils at said reference position.

18. A fastening apparatus as claimed in claim 17 wherein said other of said first and second pistons has an extending rod, said rod engagable by said indexing means to positively withdraw said first and second pistons and punches.

* * * * *